(12) United States Patent
Reed et al.

(10) Patent No.: US 8,468,330 B1
(45) Date of Patent: Jun. 18, 2013

(54) METHODS, SYSTEMS, AND DATA STRUCTURES FOR LOADING AND AUTHENTICATING A MODULE

(75) Inventors: Edwards E. Reed, Honeoye Falls, NY (US); T Iga Acar, Orem, UT (US)

(73) Assignee: Oracle International Corporation, Redwood Shores, CA (US)

( * ) Notice: Subject to any disclaimer, the term of this patent is extended or adjusted under 35 U.S.C. 154(b) by 979 days.

(21) Appl. No.: 10/612,666

(22) Filed: Jun. 30, 2003

(51) Int. Cl.
*G06F 21/00* (2006.01)

(52) U.S. Cl.
USPC ................................. 713/2; 713/164

(58) Field of Classification Search
USPC ...................... 713/2, 156, 164, 194
See application file for complete search history.

(56) References Cited

U.S. PATENT DOCUMENTS

| | | | |
|---|---|---|---|
| 4,123,747 A | 10/1978 | Lancto et al. | |
| 5,005,200 A | 4/1991 | Fischer | 380/30 |
| 5,361,359 A | 11/1994 | Tajalli et al. | 395/700 |
| 5,388,213 A | 2/1995 | Oppenheimer et al. | |
| 5,544,322 A | 8/1996 | Cheng et al. | |
| 5,579,478 A | 11/1996 | Heiserman et al. | 395/187.01 |
| 5,638,446 A | 6/1997 | Rubin | 380/25 |
| 5,692,047 A | 11/1997 | McManis | 380/4 |
| 5,892,904 A | 4/1999 | Atkinson et al. | 395/187.01 |
| 5,987,134 A | 11/1999 | Shin et al. | |
| 6,023,704 A | 2/2000 | Gerard et al. | |
| 6,041,411 A | 3/2000 | Wyatt | |
| 6,055,637 A | 4/2000 | Hudson et al. | |
| 6,073,234 A | 6/2000 | Kigo et al. | |
| 6,092,194 A | 7/2000 | Touboul | 713/200 |
| 6,107,931 A | 8/2000 | Nicholson | |
| 6,149,522 A | 11/2000 | Alcorn et al. | 463/29 |
| 6,167,513 A | 12/2000 | Inoue et al. | |
| 6,170,057 B1 | 1/2001 | Inoue et al. | |
| 6,230,271 B1 | 5/2001 | Wadlow et al. | |
| 6,516,416 B2 | 2/2003 | Gregg et al. | |
| 6,532,451 B1 | 3/2003 | Schell et al. | 705/54 |
| 6,561,425 B2 | 5/2003 | Kresina et al. | |
| 6,615,352 B2 | 9/2003 | Terao et al. | |
| 6,671,350 B1 | 12/2003 | Oxley | |
| 6,715,073 B1 * | 3/2004 | An et al. | 713/156 |
| 6,718,470 B1 | 4/2004 | Adams | |
| 6,725,269 B1 | 4/2004 | Megiddo | |

(Continued)

OTHER PUBLICATIONS

Bajaj, S., et al., "Web Services Federation Language (WS-Federation) Version 1.0," International Business Machines Corporation, et al., Jul. 8, 2003, 34 pages.

(Continued)

*Primary Examiner* — Michael S McNally
*Assistant Examiner* — Carlton Johnson
(74) *Attorney, Agent, or Firm* — Kilpatrick Townsend & Stockton LLP

(57) ABSTRACT

Methods, systems, and data structures are provided for loading, authenticating, and configuring a module. A loader authenticates the identity of an instance of the module and configuration data associated with the instance of the module. Additionally, the loader generates a loadable executable instance of the module and loads the executable instance into a customized execution environment based on the configuration data. Moreover, the loader attests to the identity of the executable instance by providing one or more assertions as an attestation. The presence of the attestation provides evidence to support automatic identity and configuration authentication for the loaded executable instance, when the executable instance requests external resources that require authentication, or when the identity of the loadable executable instance is requested.

24 Claims, 3 Drawing Sheets

U.S. PATENT DOCUMENTS

| | | | |
|---|---|---|---|
| 6,750,883 | B1 | 6/2004 | Parupudi et al. |
| 6,769,060 | B1 | 7/2004 | Dent et al. |
| 6,795,967 | B1 | 9/2004 | Evans et al. |
| 6,807,636 | B2* | 10/2004 | Hartman et al. ............. 726/14 |
| 6,836,843 | B2 | 12/2004 | Seroussi et al. |
| 6,871,279 | B2 | 3/2005 | Sames et al. |
| 6,931,440 | B1 | 8/2005 | Blumenau et al. |
| 6,937,976 | B2 | 8/2005 | Apte |
| 6,957,332 | B1* | 10/2005 | Ellison et al. ............. 713/164 |
| 7,120,802 | B2* | 10/2006 | Shear et al. ............. 713/194 |
| 7,290,288 | B2 | 10/2007 | Gregg et al. |
| 7,350,237 | B2 | 3/2008 | Vogel et al. |
| 7,788,366 | B2 | 8/2010 | Yacoby et al. |
| 7,788,711 | B1 | 8/2010 | Sun et al. |
| 2002/0029340 | A1 | 3/2002 | Pensak et al. |
| 2002/0138735 | A1 | 9/2002 | Felt et al. |
| 2003/0070091 | A1 | 4/2003 | Loveland |
| 2003/0088786 | A1 | 5/2003 | Moran et al. |
| 2003/0131232 | A1 | 7/2003 | Fraser et al. |
| 2003/0140230 | A1 | 7/2003 | de Jong et al. |
| 2004/0044643 | A1* | 3/2004 | deVries et al. ............. 707/1 |
| 2004/0064568 | A1 | 4/2004 | Arora et al. |
| 2004/0093502 | A1 | 5/2004 | Shurygailo et al. |
| 2004/0128392 | A1 | 7/2004 | Blakley, III et al. |
| 2004/0128506 | A1 | 7/2004 | Blakley, III et al. |
| 2004/0139319 | A1 | 7/2004 | Favazza et al. |
| 2004/0148326 | A1* | 7/2004 | Nadgir et al. ............. 709/200 |
| 2004/0151323 | A1 | 8/2004 | Olkin et al. |
| 2004/0210771 | A1 | 10/2004 | Wood et al. |
| 2004/0240846 | A1 | 12/2004 | Cookson et al. |
| 2005/0044411 | A1 | 2/2005 | Somin et al. |
| 2005/0068983 | A1 | 3/2005 | Carter et al. |
| 2005/0120201 | A1 | 6/2005 | Benaloh et al. |
| 2005/0144144 | A1 | 6/2005 | Graff |
| 2005/0204129 | A1 | 9/2005 | Sudia et al. |
| 2005/0216956 | A1 | 9/2005 | Orr et al. |
| 2005/0254652 | A1 | 11/2005 | Engler et al. |
| 2005/0257045 | A1 | 11/2005 | Bushman et al. |
| 2006/0005254 | A1 | 1/2006 | Ross |
| 2006/0095953 | A1 | 5/2006 | Frank |
| 2006/0100010 | A1* | 5/2006 | Gatto et al. ............. 463/29 |
| 2006/0200680 | A1 | 9/2006 | Ellison et al. |
| 2007/0061263 | A1 | 3/2007 | Carter et al. |
| 2007/0061872 | A1 | 3/2007 | Carter |
| 2007/0112574 | A1 | 5/2007 | Greene |
| 2007/0143824 | A1 | 6/2007 | Shahbazi |
| 2007/0179802 | A1 | 8/2007 | Buss et al. |
| 2007/0180490 | A1 | 8/2007 | Renzi et al. |
| 2007/0244833 | A1 | 10/2007 | Camenisch |

OTHER PUBLICATIONS

European Search Report for EP 07 122 559, dated Apr. 4, 2010, 2 pages.

Extended European Search Report for EP 06 120 148, mailed on Dec. 27, 2006, 12 pages.

Extended European Search Report for EP 06 120 149, mailed on Jan. 25, 2007, 6 pages.

Guenther-Siemens, C., SAML in Authorization Policies; draft-guenther-geopriv-saml-policy-01, 2005, 7 pages.

Hallum-Baker, P., "Security Assertions Markup Language: Core Assertion Architecture—Examples and Explanations, Draft Version 0.7," May 14, 2001, [retrieved on Oct. 1, 2002], 24 pages. Retrieved from: http://www.oasis-open.org/committees/security/docs/draft-sstc-core-phill-07.pdf.

Hughes, J., et al., "Security Assertion Markup Language (SAML) 2.0 Technical Overview," Feb. 20, 2005, OASIS Open, 2004, 40 pages.

Poniszewska-Maranda, A., "Role engineering of information system using extended RBAC model," *Proceedings of the 14th IEEE International Workshops on Enabling Technologies: Infrastructure for Collaborative Enterprise (WETICE '05)*, IEEE Computer Society, 2005, 6 pages.

Abbie Barbir Nortel Networks, *Overview and Summary of SAML v.2*, Oct. 5, 2004, 7 pages.

U.S. Appl. No. 11/225,993, filed Sep. 14, 2005, Office Action mailed Aug. 25, 2008, 24 pages.

U.S. Appl. No. 11/225,993, filed Sep. 14, 2005, Final Office Action mailed Jan. 26, 2009, 37 pages.

U.S. Appl. No. 11/225,993, filed Sep. 14, 2005, Advisory Action mailed Apr. 24, 2009, 3 pages.

U.S. Appl. No. 11/225,993, filed Sep. 14, 2005, Requirement for Restriction/Election mailed Aug. 7, 2009, 7 pages.

U.S. Appl. No. 11/225,993, filed Sep. 14, 2005, Office Action mailed Oct. 29, 2009, 21 pages.

U.S. Appl. No. 11/225,993, filed Sep. 14, 2005, Final Office Action mailed May 13, 2010, 18 pages.

U.S. Appl. No. 11/225,993, filed Sep. 14, 2005, Advisory Action mailed Sep. 29, 2010, 4 pages.

U.S. Appl. No. 11/225,994, filed Sep. 14, 2005, Office Action mailed Feb. 24, 2009, 10 pages.

U.S. Appl. No. 11/225,994, filed Sep. 14, 2005, Final Office Action mailed Jul. 30, 2009, 10 pages.

U.S. Appl. No. 11/225,994, filed Sep. 14, 2005, Office Action mailed Jan. 25, 2010, 11 pages.

U.S. Appl. No. 11/225,994, filed Sep. 14, 2005, Final Office Action mailed Jul. 22, 2010, 10 pages.

U.S. Appl. No. 11/225,994, filed Sep. 14, 2005, Advisory Action mailed Oct. 15, 2010, 3 pages.

U.S. Appl. No. 11/225,994, filed Sep. 14, 2005, Office Action mailed Sep. 19, 2011, 10 pages.

U.S. Appl. No. 11/225,994, filed Sep. 14, 2005, Notice of Allowance mailed Mar. 21, 2012, 11 pages.

U.S. Appl. No. 11/638,121, filed Dec. 13, 2006, Requirement for Restriction/Election mailed Nov. 27, 2009, 7 pages.

U.S. Appl. No. 11/638,121, filed Dec. 13, 2006, Office Action mailed Apr. 15, 2010, 14 pages.

U.S. Appl. No. 11/638,121, filed Dec. 13, 2006, Final Office Action mailed Oct. 15, 2010, 14 pages.

U.S. Appl. No. 11/638,121, filed Dec. 13, 2006, Advisory Action mailed Dec. 23, 2010, 2 pages.

U.S. Appl. No. 11/225,994, filed Sep. 14, 2005, Advisory Action mailed Oct. 27, 2009, 3 pages.

* cited by examiner

METHODS, SYSTEMS, AND DATA STRUCTURES FOR LOADING AND AUTHENTICATING A MODULE

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright © 2003, Novell, Inc., All Rights Reserved.

FIELD OF THE INVENTION

The invention relates to techniques for loading a module and authenticating its identity. More specifically, the invention relates to loading customized instances of a module and providing the instances with assertions, which vouch for the authenticity of their claimed identities.

BACKGROUND OF THE INVENTION

When a module (e.g., executable software) is loaded into an Execution Environment (XE) for processing, an XE loader copies the module into executable memory storage. It assigns and binds an identity to the loaded module instance and sets environmental parameters within the XE. Other configuration parameters may also be set to limit or constrain the behavior of the module instance when it executes. In particular, the XE uses the assigned identity of the module instance to provide resource (e.g., file, memory, and device) access rights to an executing instance of the loaded module. When a single module is loaded as multiple executable instances into the same XE for processing a variety of issues arise.

First, the XE may need to uniquely identify each executable instance for proper run-time management (identification). Second, each instance may need to be independently authenticated (authentication). Third, each instance may need to operate with different operation parameters (configuration).

Conventionally, a few different techniques have dealt with problems arising from the first issue (identification). One technique is to use existing administrator tools that assign unique XE identities to each executable instance of the module processing in the XE. This requires manual attention by an administrator to create a separate XE identity and execution environment for each executable instance. Another technique is to let the XE manage multiple executable instances by starting each instance with the same XE identity, but in its own process executable environment. For example, in UNIX® two executable instances of a module can be started inside separate shells and forked off for separate execution. This approach may create support issues for an administrator since the identity of a particular executable instance may not be readily or easily discernable within the XE. Moreover, this approach also requires manual attention by an administrator, which increases the risk of error or subversion.

The industry generally solves problems arising from the second issue (authentication) using a variety of authentication techniques. Some techniques use internal software logic associated with the module to provide self-authentication. In some execution environments, identity is inherited from the loader and reset by the module itself using an XE-provided function, such as the UNIX® function "setuid( )" Other techniques use hidden files or keys, either within the code of the application module or in files stored in the XE or similar attached storage that provide for information needed to respond to challenge-based authentication protocols (generally called credentials) by the XE or other application services with which the application instance needs to interact.

Still other techniques use third-party services that provide authentication assurances to the XE or other applications, but these, too, usually require storage of credentials for each application instance in a manner that will allow the application to retrieve them for use. These techniques may prove sufficient for authenticating the identity of the module, but often prove cumbersome and difficult to manage when authenticating the identities of multiple executable instances of the same module. In particular, these techniques introduce significant security problems when the storage of identities and credentials (e.g., passwords or keys) on disk gives access to them to administrators or hackers who may misappropriate the use of the application's identity and credential material.

The third issue (configuration) is generally dealt with by creating separate and distinct execution environments for each executable instance of the module, such that the configuration of each module is different within each environment. Yet, each separate environment is manually maintained and monitored, which is cumbersome and prone to error because of its redundant nature.

Thus, improved techniques for loading, authenticating, and configuring behaviors of a loaded module are needed.

SUMMARY OF THE INVENTION

In various embodiments of the invention, techniques are presented for securely loading and authenticating a single or multiple customized instances of a module into an XE. A loaded, customized instance of the module has access to one or more assertions provided by a loader that is trusted to verify the integrity of the code of the loaded module as well as that of the customized configuration for a particular instance of the module to the XE and other application services, either local or in the network. The one or more assertions vouch for the authenticity of each instance of the module, such that when an external resource (can be within the module's environment or out over the network in a different environment) requires authentication from an instance of the module, the appropriate assertion serves as valid authentication.

More specifically, and in one embodiment of the invention, a method to load a module is presented. An execution environment is established for an instance of a module. Next, the instance is loaded into the execution environment. Finally, an identity of the instance is attested to.

In another embodiment of the invention, a method to authenticate a loaded module is described. A loaded instance of the module makes a request to access a resource, where the access requires authorization. Next, an assertion is identified that is associated with the loaded instance, where the assertion is then attested to by a loader, which originally loaded the instance for execution.

In still another embodiment of the invention, a module loading system is taught. The system includes a configuration module and a loader. The configuration module provides configuration data for a module. The loader authenticates the configuration data and the module, and if authenticated, loads an instance of the module into an execution environment defined by at least a portion of the configuration data. Also, the loader attests to the identity of the loaded instance.

In yet another embodiment of the invention, a data structure, residing in a computer-accessible medium, is provided. The data structure is used to load a module represented by the data structure. The data structure comprises module data, module security data, and module configuration data. The module security data is authenticated by a loader. The loader uses the module configuration data to load an instance of the module data in a customized execution environment. Additionally, the loader module attests to an identity of the instance.

DETAILED DESCRIPTION OF THE INVENTION

Figure 1:
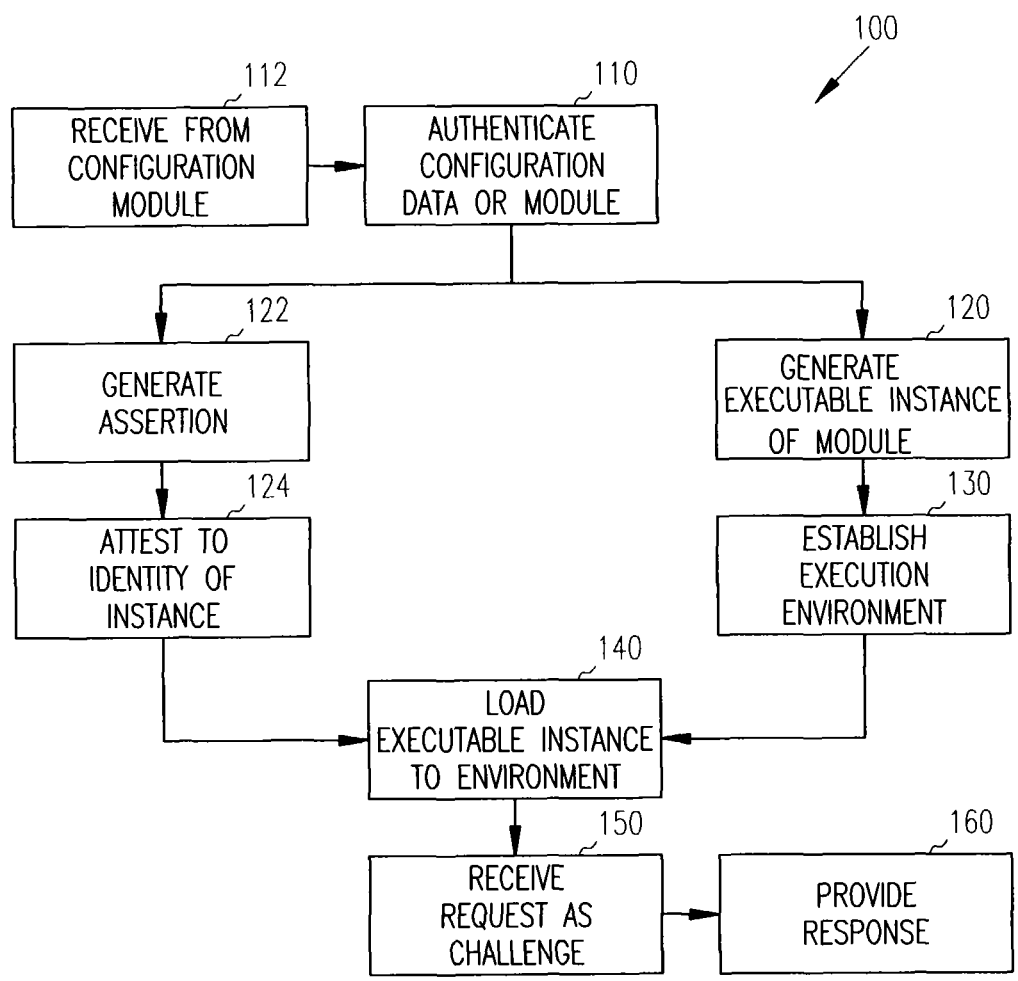
FIG. 1 is a flowchart representing a method to load a module, according to one embodiment of the invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the invention. The following description is, therefore, not to be taken in a limited sense, and the scope of the invention is defined exclusively by the appended claims.

In various embodiments of the invention, the term "module" is used. A module can be software, any data consumed by the software, or any data used to configure the software. The software can be in source code form or in executable form. A single module can include a plurality of distinct, independent, or dependent subsidiary modules. An "assertion" can be represented as an electronic oath or testament that is made in support of the veracity of one or more statements. Assertions can be relied upon to be true and are generated by attesting. Assertions can be encrypted or signed (or both encrypted and signed) and can be independently verified if need be.

An attestation is an assertion that also includes meta-information and possibly other meta-assertions (additional statements of fact about original assertions). An attestation, includes meta-information about such things as who is making an assertion, why the assertion is being made, what reasons are there for assuming the assertion is true (confidence factor), what evidence exists that form the basis of the reasons (confidence), how the assertion was verified, by whom was the assertion verified, and when the assertion was verified.

Thus, a statement becomes an assertion when it is made by someone or something (application) that believes (or wants someone else to believe) that the statement is in fact true. Assertions about assertions are attestations, and can logically be viewed as information, which if present, guarantees that certain other information has been sworn to in order to vouch for the authenticity of that certain other information (e.g., notary seal on a signature of a deed).

In one embodiment of the invention, assertions are made using Security Assertion Markup Language (SAML) assertion statements. Thus, assertions can be statements that identify an electronic resource, statements that contain specific information about an electronic resource, or statements that specify what an electronic resource is authorized to do within a given electronic context.

Various embodiments of the invention can also be used with traditional standards such as Trusted Computing Platform Alliance (TCPA) statements and attestations made using Trusted Processing Modules (TPM). Moreover, Kerberos Key Distribution Center (KDC) techniques and services can be used with various embodiments of the invention.

One embodiment of this invention is implemented using the eDirectory and iChain products distributed by Novell, Inc., of Provo, Utah. Moreover, various embodiments utilize NetWare products also distributed by Novell, Inc.

Of course, the invention can be implemented in a variety of platforms, systems, modules, and services (e.g., Public Key Infrastructure (PKI)). All such platforms, systems, modules, and services, which are modified and used to achieve the tenets of the invention and are intended to fall within the scope of the invention.

FIG. 1 is a flowchart representing one method 100 to load a module, the method 100 is implemented in an electronic module, such as a loader module. In some embodiments the loader is a strong loader that has a known electronic integrity within a computing environment or network environment. Moreover, an XE trusts the loader to verify the integrity of loaded modules within the XE and to verify configuration files and other data consumed or needed by the loaded modules. The loader also sets an execution environment for a loaded module within the XE and can associate any instance of a loaded module with a unique identity within the XE.

Optionally, at 110, the method 100 receives configuration data and a module for authentication and subsequent loading. The configuration data and module can be received, in one embodiment, from a configuration module at 112. If the method 100 authenticates the configuration data and the module before loading, then such authentication can occur in a variety of ways.

For example, a configuration module that originally creates the configuration data can set the identity for a particular instance of the module, which is embodied by the configuration data. In other words, each configuration data file represents restrictions that define a particular execution environment, that define access levels for a specific instance of the module, and that define processing capabilities for a particular instance of the module. Thus, the configuration module can assign or provide a unique identity to the particular instance of the module being represented by a configuration data file.

Moreover, the configuration module as used in embodiments of this invention can include a configuring authority. Thus, in one embodiment, the configuring authority uses a main configuration module to sign the configuration data and the module code and that configuring authority uses its own public and private key pairs to sign these items. The configuring authority can be any local or remote authority service or application. Therefore, in some embodiments of this invention, the configuration module includes software for the configuration module but also includes a configuring authority system or service.

The configuration module can also digitally sign the module software code and the configuration data with a private key that is accessible only to the configuration module and a corresponding public key of a module (e.g., available to the module for verifying the signature) that is implementing the method 100. In some embodiments, the configuration module can also encrypt (e.g., using a public key of a loader implementing the processing of the method 100) the module software code, the configuration data, and the unique identity of an instance of the module so that only the loader (which has access to its own private key) can read or understand the encrypted data or identity assignment. Moreover, the signature associated with the configuration data and the module data can be represented as an integrity assertion made by a configuration module. Thus, the configuration module can make statements about the configuration data and the module integrity, and then the configuration module can sign (and optionally encrypt) those statements, such that the authenticity of the assertion is assured by verifying the configuration module's signature.

Once the processing of the method 100 is satisfied that it has authenticated the configuration data and module, if desired, then an executable instance of the module can be instantiated by using the restrictions embodied in the configuration data, as depicted at 120. The executable instance is associated with an identity that was assigned in the configuration data. Additionally, at 122, one or more assertions for the executable instance is generated.

The assertions can represent one or more statements that the method 100 makes. For example, a statement can attest that the module code and the configuration data were verified. A statement can attest that any checksum provided by a configuration manager was validated and reconfirmed. Also, a statement can attest that any signature provided was authenticated (e.g., a signature from a configuration manager on a statement that asserts the module code and configuration data are authentic). Furthermore, a statement can attest that any signing utility was authorized to make the assertions.

The assertion can be represented, in some embodiments, as a SAML assertion and may be signed by the method 100. Additionally, in other embodiments, a configuration module provides a SAML assertion to the method 100 and signs it for the instance. Once the signature of the assertion is verified, the method 100 creates its own SAML assertion and signs the instance of the executable module. The signed SAML assertion signed by the processing of the method 100 becomes the assertion for the executable instance of the module.

The assertion serves as a voucher or testament to any external resource that the executable instance identified by its unique identity, which was provided in the configuration data, is authentic and is permitted to access resources as defined in the assertion statements. Conventionally, external resources require keys or secrets (identifiers) to be stored and verified before any access is granted. These techniques can create security holes, since secrets or keys can become compromised when acquired, distributed, and managed.

Once the assertion is generated, the processing of the method 100 attests to the identity of the executable instance with the mere presence of the assertion and statements made by the loader about the verifications it made for the module including the assertion. This is meta-information about the assertion(s) and can include meta-assertions. Attesting to the assertion(s) and providing the meta-information creates or generates an attestation. Moreover, at 130 the execution environment is established for the executable instance. Thus, various environmental variables and other processing requirements are established at 130. At 140, the executable instance along with its generated attestation is loaded into its customized execution environment of the XE.

When the executable instance is loaded within the XE, at some point during its processing life, it may become necessary for the executable instance to attest to its identity and authenticity either to the XE (which may periodically require this) or to another external resource. It is understood that an external resource can be local or remote from the executable instance, and it can be hardware, software, or firmware. Thus, the executable instance can authenticate itself to an XE or external resource by providing the loader's attestation to the XE or external resource.

The process of the method 100 (e.g., implemented as a loader) is trusted within the XE and with any requesting external resource. The loader can be trusted with any known technique in this art, such as, and by way of example only, by manual administrator fiat, by explicit designation or configuration, by reliance on a third-party, by inheritance from within a naming or certificate hierarchy, and the like. Further, TCPA and KDC can be used to establish a trusted loader.

Accordingly, the XE and any requesting external resource need only validate the loader's signature of the module's identity assertion included within the attestation to ensure proper authentication of the executable instance. Moreover, the attestation assertion's can include a number of statements that will instruct the XE or any requesting external resource on the access levels or resource needs that may be required by a processing executable instance.

In one embodiment, at 150, the method 100 receives a request for a previously created attestation assertion. Under this circumstance, the method 100 can regenerate an attestation and provide a response to the requesting XE or external resource at 160 in order to reconfirm its prior attestation assertion. In other embodiments, the processing of the method 100 can call upon other third-party services (e.g., TCPA or KDC) and third-party modules (e.g., TPM) to provide the requesting EX or external resource with additional assurances indicating that the integrity of the executable instance is as it is purported to be by the attestation assertion(s).

One of ordinary skill in this art now understands how a module can be loaded as multiple instances within a computing environment (using multiple configuration data files), where each instance includes its own access levels and attributes and can be separately authenticated and tracked as a unique module with an XE by its unique identity. Moreover, by associating an assertion with each executable instance, subsequent authentication is easily achieved. Thus, business-to-business (B2B) systems and other modules can be seamlessly integrated with the teachings of this invention, since secrets and private keys need not be maintained within modules nor maintained within external resources because the assertion statements serve the purpose of vouching for the identities of the executable instances of the module.

For example, consider a single module that is a database service, where it is desirable to have three separate instances of the database service running in a single computing environment. A first instance is needed for a marketing department, a second instance is needed for an engineering department, and a third instance is needed for data and services that are commonly available to both the marketing and the engineering departments.

In this example, a single configuration module can create a configuration data file for the marketing instance, a configuration data file for the engineering instance, and a configuration data file for the common instance. The configuration module can attest to the identity of each configuration data file by providing assertion statements as to its authenticity. Each configuration data file can identify its unique identity, identify needed resources, and identify access levels associated with the unique identity for a processing instance of the module.

Each separate configuration data file is then separately provided to a loader (e.g., implementing the processing of the method 100) where each configuration data file is verified for authenticity. Each configuration data file is then processed to generate a loadable instance representing the constraints of each configuration data file and having unique identities for each separate instance of a processing module. The loader then attest to the identities of each instance by providing assertion statements for each instance of the database service within the XE.

As each instance separately processes, it may become necessary to access other services, or to authenticate each instance to an external resource or to the XE. In these situations, there is no need to manually provide a secret or key to the challenging service, XE, or resource, since each instance needs only provide the assertion statements that were provided by the loader. The loader attested to and provided assertion statements serve as a passport or visa for each instance (e.g., the attestation).

Figure 2:
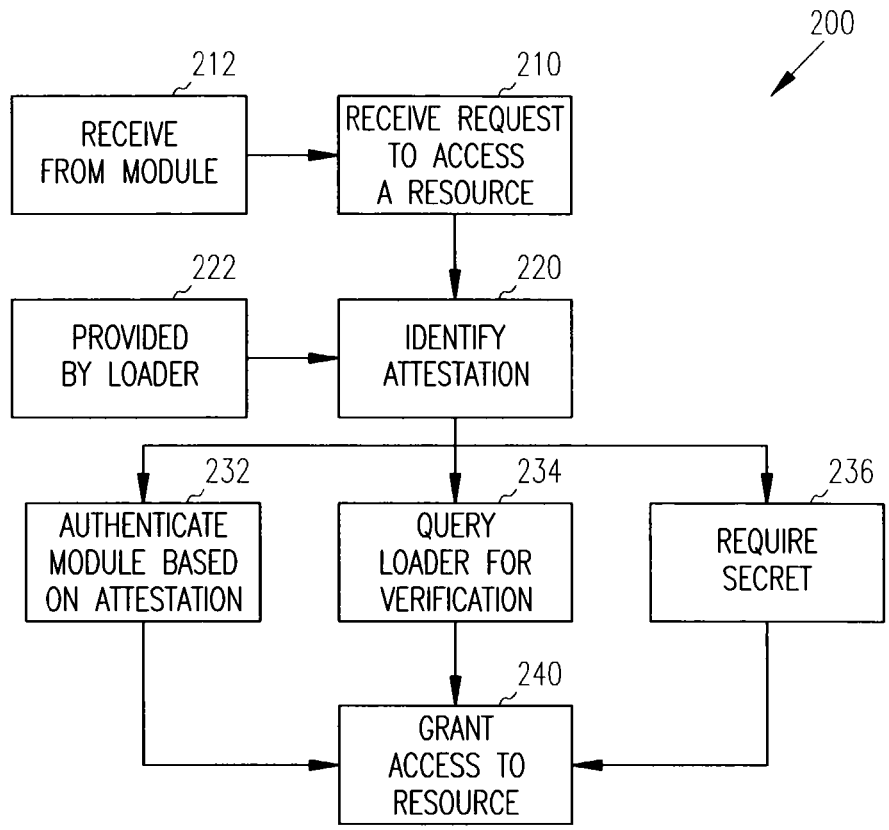
FIG. 2 is a flowchart representing a method to authenticate a loaded module, according to one embodiment of the invention.

FIG. 2 is a flowchart of a method 200 for authenticating a loaded module. The method 200 is implemented as an executable module or as firmware within a hardware resource. Thus, the method 200 can be any external resource that can interface with the process defined in FIG. 1 with the method 100 (e.g., a loader).

At 210, a request is received to access a resource under the control of the processing implementing the method 200. The request is received from a module at 212. The module can be local or remote from the processing of the method 200. Furthermore, a resource can be a device, a file, a module, a directory, an object, a peripheral, a system, and the like. The processing of the method 200 manages or controls the desired resource. Moreover, access to the resource is restricted or secured, such that any request must be authenticated before access is granted to the module making the request.

At 220, an identity assertion is associated with the module making the request. The identity statement is provided by the module as an attempt to gain access to the resource on the basis of having the presence of the assertion statement. The identity statement was originally provided to the module by a loader at 222. The loader verified the authenticity of the module's identity at the time the requesting module was initially loaded for processing. This is confirmed by the loader provided attestation having one or more identity statements.

If communications between the method 200 and the loader are trusted and secure, then, at 232, the request and the module are authenticated for access to the resource on the basis of the mere presence of a valid attestation by a trusted loader and the identity statements that are the subject of that attestation. In some embodiments, the attestation is validated by verifying a digital signature of the attestation to ensure it was signed by the loader.

In other embodiments, at 234, the attestation or a number of included assertions may be stale in view of the method 200, and thus a query or a series of queries are made to the loader about the requesting module. After the loader satisfies the requests or regenerates a new up-to-date attestation, if required, the module and the request are authenticated for access to the resource at 240.

In some embodiments, the processing of the method 200 may not have a trusted and secure communication relationship with the loader that provided the original attestations and included assertions. In these embodiments, a secret is required for access, as depicted at 236. When this occurs, the requesting module can go to a secret data store service that does in fact trust that loaded module and request access to the module's secret data store to acquire the proper secret. Once obtained, the secret is provided to the method 200, and access is granted to the module and the request at 240.

In still other embodiments, the method 200 can also check to make sure that any digital certificate associated with the requesting module or the loader has not been revoked since the loader originally generated the attestation. In these instances, a check can be made with a certificate authority against the identity of the requesting module or the loader, and if no revocation has occurred, access can be granted to the resource. But, if a revocation is detected, then access to the resource is denied, since the attestation or a number of included assertions associated therewith are stale.

One of ordinary skill in the art now appreciates how an external resource or module can authenticate an identity or configuration of a requesting module for access to a resource under its control by checking for the presence of an attestation generated by a loader. In many instances, this will eliminate the need for secrets that are maintained and provided when an external resource authenticates a request for access. With no secrets being required, security is improved.

Figure 3:
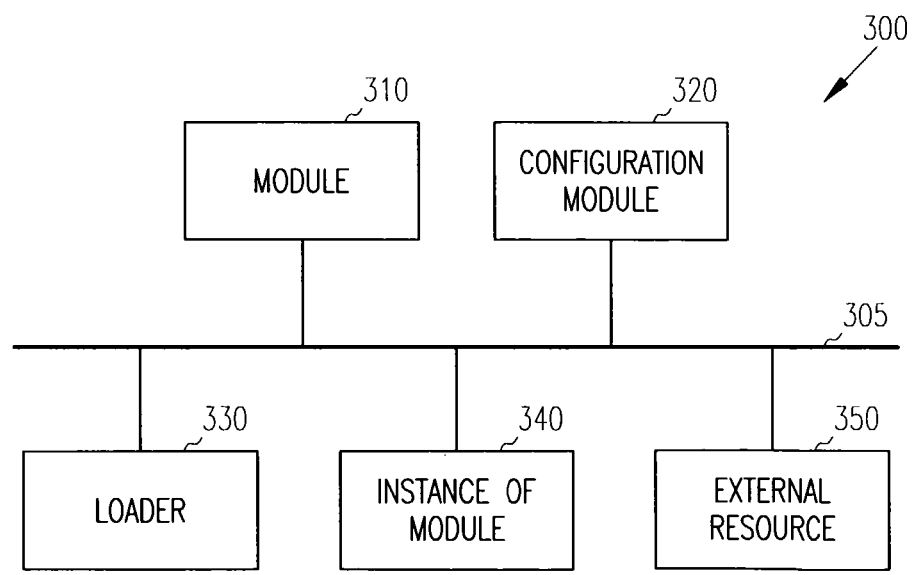
FIG. 3 is a diagram of a module loading system, according to one embodiment of the invention.

FIG. 3 is a diagram of a module loading system 300. The module loading system 300 is implemented in a computing environment and includes a module 310, a configuration module 320, a loader 330, an instance of a loaded module 340, and optionally an external resource 350. Each of the components of the module loading system 300 can exist within a single computing device (not shown in FIG. 3) or can be distributed across multiple computing devices and interfaced via a network 305.

The configuration module 320 provides configuration data for a module 310. The loader 330 uses the configuration data to generate and load a specific instance and identity for the module 340 into an XE. Additionally, the configuration module 320 can authenticate and verify the configuration data and the module 310 and provide an assertion to the loader 330 indicating the same.

For example, the configuration module 310 can create a SAML assertion with statements indicating the configuration module 310 authenticated the configuration data and the module. The assertion can be signed with a private key of the configuration module 310. Thus, the loader 330 can verify the signature of the configuration module 310 on the SAML assertion by using the configuration module's 310 public key. Once the signature is verified, the loader 330 can rely on the veracity of the statements provided in the assertion.

In other embodiments, the loader 330 independently authenticates the configuration data and the module, by checking a checksum value provided by the configuration module 310, and the like. Once the configuration data and the module 310 are authenticated as legitimate, the loader 330 loads an executable instance of the module 340 that conforms to the limitations and restrictions defined in the configuration data. The loader 330 also sets an XE identity for the instance of the module 340, where the identity is acquired from the configuration data.

Additionally, the loader 330 generates a number of additional assertions having meta-information as an attestation. The attestation is also associated with the instance of the module 340. The attestation includes assertion statements about the authentication operations taken by the loader 330 against the configuration data and the module 310 in order to attest to the identity of the instance 340. The attestation serves as a testament that someone of authority, namely the loader 330, is vouching for the authenticity of the assertion statements included with the attestation.

The external resource 350 grants access to the instance of the module 340 based on the presence of the attestation, which the loader 330 generated. The external resource 350 need not revalidate the module code 310 or configuration data 320 for the instance 330, since the signed version of these serve as a biometric fingerprint, and the assertions attested to by the loader 330 serve as a notary's witness to an electronic document that contains that fingerprint.

Thus, when the external resource 350 satisfies itself that the attestation is from the loader 330, the instance of the module 340 is given access to the external resource 350. There is no need to send or check for secrets or keys as is traditionally required.

Moreover, there is no need to involve third-party services to provide validation, since the loader 330 serves as a trusted and secure third party for the external resource 350 if any further verification (e.g., a stale or challenged attestation or particular assertions included within the attestation) is required beyond the mere presence of the attestation. Thus, in some embodiments, the external resource 350 can engage the loader 330 in a dialogue if questions exist about the provided attestation or a number of the included assertions associated therewith. In these instances, the loader 330 may seek the services of other third-party services to assist in convincing the external resource 350 that a provided attestation or particular assertion is legitimate.

Figure 4:
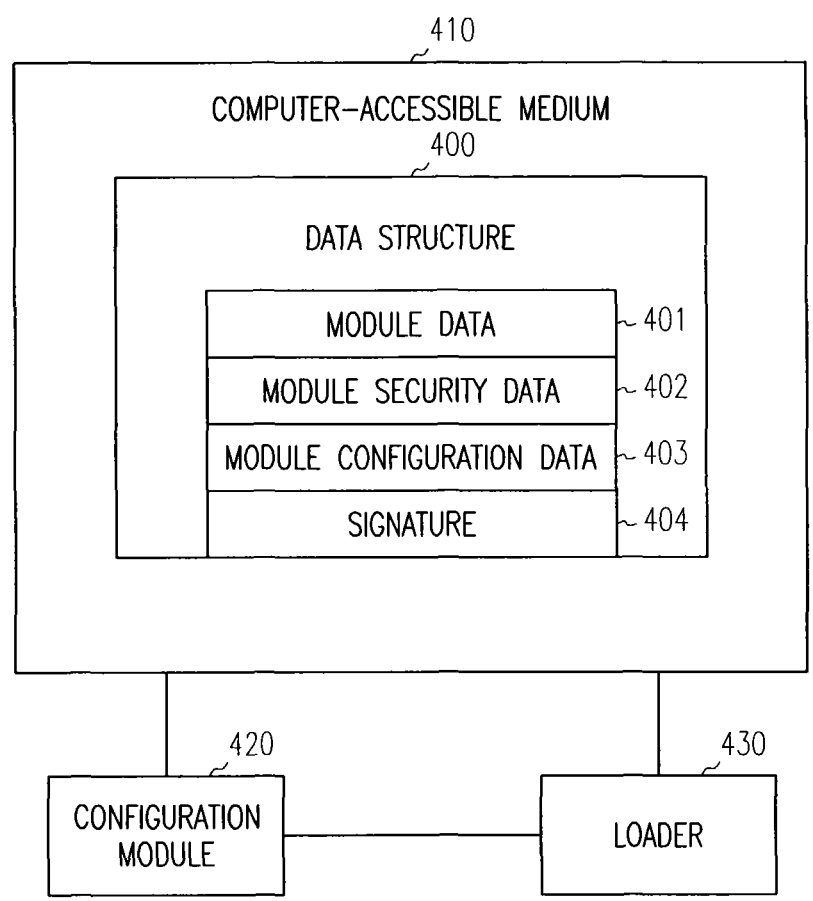
FIG. 4 is a diagram of a data structure used to load a module, according to one embodiment of the invention.

FIG. 4 illustrates a data structure 400 used to load a module represented by the data structure 400. The data structure 400 includes module data 401, module security data 402, module configuration data 403, and, optionally, a digital signature 404. The data structure 400 is accessible in a single computer-accessible medium 410 or a plurality of computer-accessible media 410.

In one embodiment, the data structure 400 represents a module manifest including data values necessary to generate a specific instance of a module or authenticate a specific instance of a loaded module and its configuration within an XE. A configuration module 420 initially generates the module manifest, and the loader 430 loads the specific instance of the module into an XE. The loader 430 can alter the module manifest when loading the specific instance of the module to the XE.

The module data 401 is the software logic and other data necessary for generating an executable instance of a module that can be loaded into the XE. Thus, the module data 401 can include source code, binary (compiled and linked), file identifiers, directory identifiers, or other data used by the module during execution.

The module security data 402 can be security validation data, such as license certificates, code signatures, activation certificates, installation certificates, and the like. Any security or encryption technique (e.g., PKI) or assertion technique (e.g., SAML assertions) can produce the model security data 402. The configuration module 420 can originally create the module security data 402, which the loader 430 can subsequently add to or modify. Thus, the module security data 402 can serve as a running security history for an instance of a module represented by the data structure 400.

The configuration module 420 generates the module configuration data 403. The module configuration data 403 includes a unique identity and configuration to use for an instance of a module (where the instance is constrained by the strictures defined in the configuration data 403), domain restrictions on the instance of the module, access levels for security and integrity, any roles that the instance of the module is to be associated with, any resource identifications that the instance of the module can access or will need to access, and any resources that the instance of the module may be providing when loaded and executed within the XE.

In some embodiments, the data structure 400 can also include a number of hashes for purposes of validating various aspects of the module code, certificates, and any provided assertions. Moreover, in one embodiment, the data structure 400 includes a signature 404 of the configuration module 420, the loader 430, or both the configuration module 420 and the loader 430.

The loader 430 initially consumes the data structure 400 in order to generate an instance, represented by the module configuration data 403, which is loaded into an XE for execution. The loader 430 also attests to the authenticity of the module security data 402 and can ensure that the module data 401 includes an executable form of the desired module. In this way, the data structure 400 can be altered and consumed throughout the life span of a specific instance of a module. Thus, when an instance requests access to an external resource or is challenged by the XE or an external resource, the instance can provide its module security data 402 to the requester, which has assertion statements attested to by the loader 430 (the model security data 402 serving as a loader generated and provided attestation). A signature 404 can then be checked to ensure loader 430 signed the data structure 400, and if so, authentication of the instances identity is immediately established.

One of ordinary skill in this art now understands how a unique and novel data structure can be implemented with the tenets of this invention to permit modules to be loaded and authenticated more efficiently in diverse and heterogeneous electronic environments where a variety of security and disparate modules need to be managed and interfaced together.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method to load a module, comprising:
establishing, on a computer system, an execution environment for a plurality of executable instances of a module;

processing, by a loader module of the execution environment, restrictions embodied in a configuration data file, the restrictions defining processing capabilities for each of the plurality of executable instances, access levels for each of the plurality of executable instances within the execution environment, and an identity for each of the plurality of executable instances within the execution environment, each of the plurality of executable instances having its own independent access levels, unique identity, and attributes within the execution environment, the configuration data file also signed by a configuring authority;

loading, by the loader module, each of the plurality of executable instances in the execution environment based on the processing of the restrictions in the configuration data file; and attesting to the identity of each of the plurality of executable instances by the loader module, attesting comprises generating, by the loader module and based at least in part on the configuration data file, attestation for an assertion of the instance and the assertion comprises an encrypted and digitally signed plurality of Security Assertion Markup Language (SAML) statements, the SAML statements comprising:

a statement identifying who made the assertion, one or more statements identifying reasons for assuming the assertion is true, one or more statements identifying evidence that forms the basis of the reasons, one or more statements identifying a manner in which the assertion was verified, a statement identifying by whom the assertion was verified, a statement identifying when the assertion was verified, one or more statements identifying indications as to what the instance of the module is authorized to do within a given context, a statement indicating that a checksum for the instance was validated for integrity of the instance, and one or more statements instructing a requesting resource on resource needs required by the instance within the execution environment;

wherein an external resource relies on the attestation as a testament that the identity is authentic and as an indication that the instance is permitted to access the external resource.

2. The method of claim 1 wherein establishing further includes authenticating the module and the identity of each of the plurality of instances.

3. The method of claim 1 further comprising providing, by the loader module, a response to an external resource that requests the identity or configuration of at least one of the plurality of instances.

4. The method of claim 3 further comprising providing a response to the external resource that attest to the identity of the at least one instance.

5. The method of claim 1, further comprising:

receiving, by the loader module from a loaded instance of the plurality of executable instances, a request to access a resource, the access requires authorization;

receiving, by the loader module from the loaded instance, an attestation that is associated with the loaded instance;

authenticating, by the loader module, the loaded instance based on the attestation and without the use of any keys, and tracking, by the loader module, actions of the loaded instance within the execution environment.

6. The method of claim 5 further comprising, ensuring that a certificate associated with the instance has not expired or been revoked before granting the instance access to the resource.

7. The method of claim 6 wherein ensuring further includes, querying the certificate authority to determine if the certificate has been revoked since the loader provided the attestation.

8. The method of claim 5 wherein identifying further includes, a known to be secure and trusted loader as the loader.

9. A system comprising:

a processor; and a memory coupled with and readable by the processor and having stored thereon a sequence of instructions which, when executed by the processor, causes the processor to establish an execution environment for a plurality of executable instances of a module and load the module into the execution environment by:

processing, by a loader module of the execution environment, restrictions embodied in a configuration data, the restrictions-defining processing capabilities for each of the plurality of executable instances, access levels for each of the plurality of executable instances within the execution environment, and an identity for each of the plurality of executable instances within the execution environment, each of the plurality of executable instances having its own independent access levels, unique identity, and attributes within the execution environment, the configuration data file also signed by a configuring authority, loading, by the loader module, each of the plurality of executable instances in the execution environment based on the processing of the restrictions in the configuration data file, and attesting to the identity of each of the plurality of executable instances by the loader module, attesting comprises generating, by the loader module and based at least in part on the configuration data file, attestation for an assertion of the instance and the assertion comprises an encrypted and digitally signed plurality of Security Assertion Markup Language (SAML) statements, the SAML statements comprising:

a statement identifying who made the assertion, one or more statements identifying reasons for assuming the assertion is true, one or more statements identifying evidence that forms the basis of the reasons, one or more statements identifying a manner in which the assertion was verified, a statement identifying by whom the assertion was verified, a statement identifying when the assertion was verified, one or more statements identifying indications as to what the instance of the module is authorized to do within a given context, a statement indicating that a checksum for the instance was validated for integrity of the instance, and one or more statements instructing a requesting resource on resource needs required by the instance within the execution environment;

wherein an external resource relies on the attestation as a testament that the identity is authentic and as an indication that the instance is permitted to access the external resource.

10. The system of claim 9 wherein establishing further includes authenticating the module and the identity of each of the plurality of instances.

11. The system of claim 9 further comprising providing, by the loader module, a response to an external resource that requests the identity or configuration of at least one of the plurality of instances.

12. The system of claim 11 further comprising providing a response to the external resource that attest to the identity of the at least one instance.

13. The system of claim 9, further comprising:
receiving, by the loader module from a loaded instance of the plurality of executable instances, a request to access a resource, the access requires authorization;
receiving, by the loader module from the loaded instance, an attestation that is associated with the loaded instance;
authenticating, by the loader module, the loaded instance based on the attestation and without the use of any keys; and
tracking, by the loader module, actions of the loaded instance within the execution environment.

14. The system of claim 13 further comprising, ensuring that a certificate associated with the instance has not expired or been revoked before granting the instance access to the resource.

15. The system of claim 14 wherein ensuring further includes, querying the certificate authority to determine if the certificate has been revoked since the loader provided the attestation.

16. The system of claim 13 wherein identifying further includes, a known to be secure and trusted loader as the loader.

17. A computer-readable memory having stored therein a sequence of instructions which, when executed by a processor, causes the processor to establish an execution environment for a plurality of executable instances of a module and load the module into the execution environment by:
processing, by a loader module of the execution environment, restrictions embodied in a configuration data, the restrictions-defining processing capabilities for each of the plurality of executable instances, access levels for each of the plurality of executable instances within the execution environment, and an identity for each of the plurality of executable instances within the execution environment, each of the plurality of executable instances having its own independent access levels, unique identity, and attributes within the execution environment, the configuration data file also signed by a configuring authority,
loading, by the loader module, each of the plurality of executable instances in the execution environment based on the processing of the restrictions in the configuration data file, and
attesting to the identity of each of the plurality of executable instances by the loader module, attesting comprises generating, by the loader module and based at least in part on the configuration data file, attestation for an assertion of the instance and the assertion comprises an encrypted and digitally signed plurality of Security Assertion Markup Language (SAML) statements, the SAML statements comprising:
a statement identifying who made the assertion,
one or more statements identifying reasons for assuming the assertion is true,
one or more statements identifying evidence that forms the basis of the reasons,
one or more statements identifying a manner in which the assertion was verified,
a statement identifying by whom the assertion was verified,
a statement identifying when the assertion was verified,
one or more statements identifying indications as to what the instance of the module is authorized to do within a given context,
a statement indicating that a checksum for the instance was validated for integrity of the instance, and
one or more statements instructing a requesting resource on resource needs required by the instance within the execution environment;
wherein an external resource relies on the attestation as a testament that the identity is authentic and as an indication that the instance is permitted to access the external resource.

18. The computer-readable memory of claim 17 wherein establishing further includes authenticating the module and the identity of each of the plurality of instances.

19. The computer-readable memory of claim 17 further comprising providing, by the loader module, a response to an external resource that requests the identity or configuration of at least one of the plurality of instances.

20. The computer-readable memory of claim 19 further comprising providing a response to the external resource that attest to the identity of the at least one instance.

21. The computer-readable memory of claim 17, further comprising:
receiving, by the loader module from a loaded instance of the plurality of executable instances, a request to access a resource, the access requires authorization;
receiving, by the loader module from the loaded instance, an attestation that is associated with the loaded instance;
authenticating, by the loader module, the loaded instance based on the attestation and without the use of any keys; and
tracking, by the loader module, actions of the loaded instance within the execution environment.

22. The computer-readable memory of claim 21 further comprising, ensuring that a certificate associated with the instance has not expired or been revoked before granting the instance access to the resource.

23. The computer-readable memory of claim 22 wherein ensuring further includes, querying the certificate authority to determine if the certificate has been revoked since the loader provided the attestation.

24. The computer-readable memory of claim 21 wherein identifying further includes, a known to be secure and trusted loader as the loader.

* * * * *

UNITED STATES PATENT AND TRADEMARK OFFICE
CERTIFICATE OF CORRECTION

PATENT NO. : 8,468,330 B1
APPLICATION NO. : 10/612666
DATED : June 18, 2013
INVENTOR(S) : Reed et al.

Page 1 of 1

It is certified that error appears in the above-identified patent and that said Letters Patent is hereby corrected as shown below:

In the Specification

In column 1, line 59, delete "discernable" and insert -- discernible --, therefor.

Signed and Sealed this
Twenty-second Day of October, 2013

Teresa Stanek Rea
*Deputy Director of the United States Patent and Trademark Office*